United States Patent
Yu et al.

(10) Patent No.: US 9,614,236 B2
(45) Date of Patent: Apr. 4, 2017

(54) METHOD FOR MITIGATING CELL DEGRADATION DUE TO STARTUP AND SHUTDOWN VIA CATHODE RE-CIRCULATION COMBINED WITH ELECTRICAL SHORTING OF STACK

(75) Inventors: Paul Taichiang Yu, Pittsford, NY (US); Frederick T. Wagner, Fairport, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1944 days.

(21) Appl. No.: 11/463,622

(22) Filed: Aug. 10, 2006

(65) Prior Publication Data
US 2008/0038602 A1   Feb. 14, 2008

(51) Int. Cl.
| | | |
|---|---|---|
| *H01M 8/04* | (2016.01) | |
| *H01M 8/04089* | (2016.01) | |
| *H01M 8/04223* | (2016.01) | |
| *H01M 8/04537* | (2016.01) | |
| *H01M 8/04791* | (2016.01) | |
| *H01M 8/04955* | (2016.01) | |
| *H01M 8/04746* | (2016.01) | |
| *H01M 8/1018* | (2016.01) | |

(52) U.S. Cl.
CPC ... *H01M 8/04097* (2013.01); *H01M 8/04223* (2013.01); *H01M 8/04238* (2013.01); *H01M 8/04559* (2013.01); *H01M 8/04791* (2013.01); *H01M 8/04955* (2013.01); *H01M 8/04746* (2013.01); *H01M 2008/1095* (2013.01); *H01M 2250/20* (2013.01); *Y02E 60/50* (2013.01); *Y02T 90/32* (2013.01)

(58) Field of Classification Search
CPC ......... H01M 8/04097; H01M 8/04223; H01M 8/04238; H01M 8/04559; H01M 8/04791; H01M 8/04955; H01M 8/04746; H01M 2250/20; Y02T 90/32; Y02E 60/50
USPC .................................................. 429/34, 429
See application file for complete search history.

(56) References Cited

U.S. PATENT DOCUMENTS

| | | | |
|---|---|---|---|
| 6,124,054 A * | 9/2000 | Gorman et al. ................ | 429/34 |
| 6,514,635 B2 | 2/2003 | Van Dine et al. | |
| 6,635,370 B2 * | 10/2003 | Condit et al. .................. | 429/13 |
| 2001/0055705 A1 | 12/2001 | Yagi | |
| 2002/0076582 A1 | 6/2002 | Reiser et al. | |
| 2002/0076583 A1 | 6/2002 | Reiser et al. | |
| 2002/0102443 A1 | 8/2002 | Yang et al. | |
| 2004/0001980 A1 * | 1/2004 | Balliet et al. .................. | 429/13 |
| 2005/0031917 A1 * | 2/2005 | Margiott et al. ............... | 429/17 |
| 2006/0251937 A1 | 11/2006 | Inai et al. | |
| 2007/0154743 A1 * | 7/2007 | Zhang et al. ................... | 429/13 |
| 2007/0231623 A1 * | 10/2007 | Limbeck et al. ............... | 429/13 |

FOREIGN PATENT DOCUMENTS

| | | |
|---|---|---|
| JP | 4-294065 | 10/1992 |
| JP | 2005-267910 A | 9/2005 |

(Continued)

*Primary Examiner* — Milton I Cano
*Assistant Examiner* — Stephen Yanchuk
(74) *Attorney, Agent, or Firm* — John A. Miller; Miller IP Group, PLC

(57) ABSTRACT

A fuel cell system that employs a process for minimizing corrosion in the cathode side of a fuel cell stack in the system by combining cathode re-circulation and stack short-circuiting at system shut-down and start-up.

10 Claims, 1 Drawing Sheet

(56) References Cited

FOREIGN PATENT DOCUMENTS

| | | |
|---|---|---|
| JP | 2006-040611 A | 2/2006 |
| JP | 2006-086019 A | 3/2006 |
| JP | 2006-114434 A | 4/2006 |
| JP | 2006-147213 A | 6/2006 |

\* cited by examiner

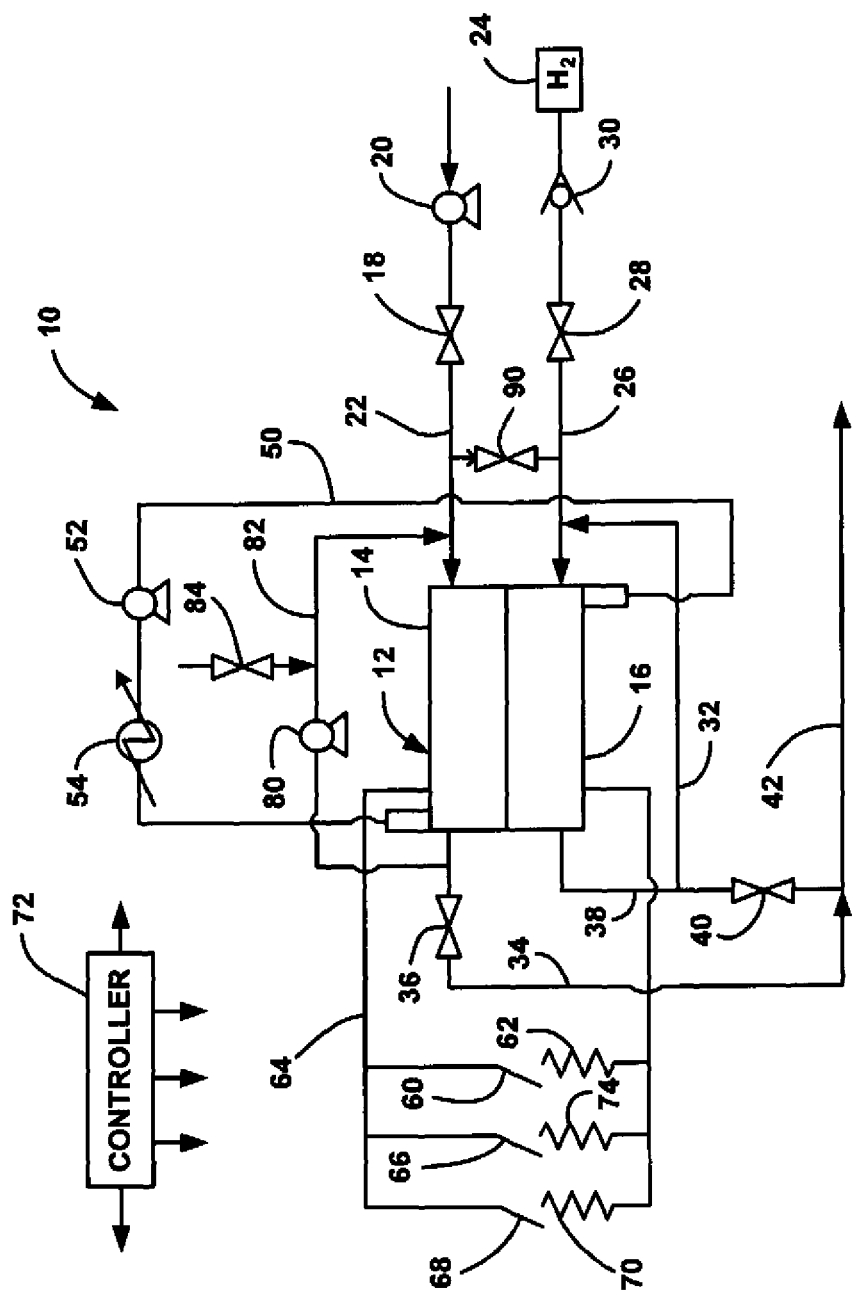

METHOD FOR MITIGATING CELL DEGRADATION DUE TO STARTUP AND SHUTDOWN VIA CATHODE RE-CIRCULATION COMBINED WITH ELECTRICAL SHORTING OF STACK

BACKGROUND OF THE INVENTION

1. Field of the Invention

This invention relates generally to a fuel cell system that includes a process for minimizing corrosion in the cathode side of a fuel cell stack and, more particularly, to a fuel cell system that includes a process for minimizing corrosion in the cathode side of a fuel cell stack, where the process includes combining a stack electrical shorting technique and a cathode re-circulation technique at system start-up and shut-down.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode, typically by a catalyst, to generate free hydrogen protons and electrons. The hydrogen protons pass through the electrolyte to the cathode. The hydrogen protons react with the oxygen and the electrons, typically by a catalyst, in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The combination of the anode, cathode and membrane define a membrane electrode assembly (MEA).

Several fuel cells are typically combined in a fuel cell stack to generate the desired power. For example, a typical fuel cell stack for a vehicle may have four hundred stacked fuel cells. The fuel cell stack receives a cathode reactant gas as a flow of air, typically forced through the stack by a compressor. Not all of the oxygen in the air is consumed by the stack and some of the air is output as a cathode exhaust gas that may include water as a stack by-product. The fuel cell stack also receives an anode hydrogen reactant gas that flows into the anode side of the stack.

When a fuel cell system is shut down, un-reacted hydrogen gas remains in the anode side of the fuel cell stack. This hydrogen gas is able to diffuse through or cross over the membrane and react with the oxygen in the cathode side. As the hydrogen gas diffuses to the cathode side, the total pressure on the anode side of the stack is reduced below ambient pressure. This pressure differential draws air from ambient into the anode side of the stack. When the air enters the anode side of the stack it generates an air/hydrogen front that creates a short circuit in the anode side, resulting in a lateral flow of hydrogen ions from the hydrogen flooded portion of the anode side to the air-flooded portion of the anode side. This high ion current combined with the high lateral ionic resistance of the membrane produces a significant lateral potential drop (~0.5 V) across the membrane. This produces a local high potential between the cathode side opposite the air-filled portion of the anode side and adjacent to the electrolyte that drives rapid carbon corrosion, and causes the carbon layer to get thinner. This decreases the support for the catalyst particles, which decreases the performance of the fuel cell.

It is known in the art to purge the hydrogen gas out of the anode side of the fuel cell stack at system shut-down by forcing air from the compressor into the anode side at high pressure. The air purge also creates an air/hydrogen front that causes the cathode carbon corrosion, as discussed above. Thus, it is desirable to reduce the air/hydrogen front residence time to be as short as possible, where the front residence time is defined as the anode flow channel volume divided by the air purge flow rate. Higher purge rates will decrease the front residence time for a fixed anode flow channel volume.

It is also known in the art to provide cathode re-circulation to reduce cathode corrosion at system shut-down. Particularly, it is known to pump a mixture of air and a small amount of hydrogen through the cathode side of the stack at system shut-down so that the hydrogen and oxygen combine in the cathode side to reduce the amount of oxygen, and thus the potential that causes the carbon corrosion.

It is also known to short circuit the stack with a suitable resistor at system shut-down to reduce the amount of oxygen on the cathode side of the stack, and thus cathode side corrosion. It has been shown that these two techniques do provide mitigation of carbon corrosion on the cathode side of the stack. However, improvements can be made.

SUMMARY OF THE INVENTION

In accordance with the teachings of the present invention, a fuel cell system is disclosed that employs a process for minimizing corrosion in the cathode side of a fuel cell stack in the system by combining cathode re-circulation and stack short-circuiting at system shut-down and start-up. A compressor provides an air flow to the cathode side of the fuel cell stack, and a hydrogen source provides a hydrogen gas flow to the anode side of the fuel cell stack. A first switch connects power from the stack to a primary load, a second switch connects power from the stack to an auxiliary load, and a third switch connects power from the stack to a shorting resistor. A cross-over valve provides air flow from the compressor to the anode side of the stack. A re-circulation line re-circulates cathode exhaust gas to the cathode side of the stack, and a bleed valve bleeds hydrogen gas into the re-circulation line. A controller controls the hydrogen gas in the re-circulation line, the switches and the cross-over valve in a selective and sequential manner to provide the cathode re-circulation and stack short-circuiting.

Additional features of the present invention will become apparent from the following description and appended claims, taken in conjunction with the accompanying drawings.

BRIEF DESCRIPTION OF THE DRAWINGS

FIG. 1 is a schematic diagram of a fuel cell system employing a procedure for minimizing cathode corrosion in the cathode side of a fuel cell stack, according to an embodiment of the present invention.

DETAILED DESCRIPTION OF THE EMBODIMENTS

The following discussion of the embodiments of the invention directed to a process for minimizing corrosion in a cathode side of a fuel cell stack by combining a cathode re-circulation process and a stack short-circuiting process at system start-up and shut-down is merely exemplary in nature, and is in no way intended to limit the invention or its applications or uses.

FIG. 1 is a schematic diagram of fuel cell system 10 including a fuel cell stack 12 having a cathode side 14 and an anode side 16. A compressor 20 provides compressed air on a cathode input line 22 through a control valve 18 to the cathode side 14 of the fuel cell stack 12. Hydrogen gas is provided from a hydrogen source 24, such as a compressed gas tank, on an anode input line 26 through a control valve 28 to the anode side 16 of the fuel cell stack 12. Cathode exhaust is output from the fuel cell stack 12 on a cathode exhaust line 34 through a control valve 36. Likewise, anode exhaust is output from the fuel cell stack 12 on an anode exhaust line 38 through a control valve 40. In some fuel cell system designs, the anode exhaust on the line 38 may be re-circulated back to the anode input line 26 on line 32.

A cooling fluid is pumped through the fuel cell stack 12 and a cooling fluid line 50 by a pump 52. A heat exchanger 54, such as a suitable radiator, cools the heated cooling fluid heated by stack operation. The speed of the pump 52, and thus the pumping capacity, can be selectively increased or decreased to provide a desired fuel cell stack operating temperature, such as 80° C. Also, the size of the heat exchanger 54 and the speed of a fan (not shown) that may force air through the heat exchanger 54 can be controlled for the same purpose. A controller 72 controls the operation of the various valves, pumps and switches in the system 10 consistent with the discussion herein.

During normal stack operation, the valves 84 and 90 are closed, the pump 80 is off, and the valves 18, 28, 36 and 40 are open to provide the air flow to the cathode side 14 of the stack 12 and the hydrogen gas to the anode side of the stack 12. Also, a switch 60 is closed to provide output power from the fuel cell stack 12 to a primary load 62, such as a vehicle drive-train, on an external circuit 64. Switches 66 and 68 are open to prevent power from the fuel cell stack 12 from being delivered to an auxiliary load 74 and a shorting resistor 70, respectively.

When the system 10 is shut-down, the switch 60 is opened and the switch 66 is immediately closed so that output power from the stack 12 is delivered to the auxiliary load 74 to disconnect the primary load 62, but avoid an open circuit voltage. Further, the cathode side control valves 18 and 36 are closed, and a cathode re-circulation pump 80 is turned on to re-circulate the remaining gas in the cathode side 14 through a re-circulation line 82 to the cathode input line 22. Additionally, a bleed valve 84 is selectively opened and closed to bleed a low concentration of hydrogen gas from the source 24 into the re-circulation line 82. In one embodiment, the concentration of hydrogen gas bled into the line 82 is less than four percent. There are several techniques for bleeding hydrogen into the cathode side of a fuel cell stack at system shut-down that are known in the art.

The anode side 16 is maintained slightly above the ambient pressure by bleeding a small amount of hydrogen gas into the anode side 16 through the control valve 28. The concentration of oxygen in the line 82 and the cathode side 14 will begin to decrease as a result of the hydrogen-oxygen reaction and the electricity that is drawn by the auxiliary load 74 will cause the cathode potential to decrease. When the cell voltages in the stack 12 are reduced to a predetermined range, such as 0.2-0.8V, the switch 66 is opened and the switch 68 is closed to short-circuit the output of the stack 12 across the resistor 70 to dissipate the remaining amount of stack output power.

Once the cell voltage drops below the low end of the range, such as 0.2V, the controller 72 stops the re-circulation pump 80 and closes the hydrogen bleed valve 84. The controller 72 then opens a cross-over valve 90, opens the anode side control valves 28 and 40 and starts the compressor 20 to use air to purge the remaining hydrogen gas out of the anode side 16 for a short period of time at a high flow rate. A check valve 30 prevents air from the compressor 20 from flowing into the source 24. The compressor 20 is then stopped and the cross-over valve 90 is closed. Therefore, after the shut-down procedure, both the cathode side 14 and the anode side 16 of the stack 12 are filled with air and cathode side corrosion is minimized.

At the start-up procedure, after the cathode side 14 and the anode side 16 are filled with air and the switch 68 is still closed from the shut-down procedure, the re-circulation pump 80 is turned on and hydrogen gas is injected into the re-circulation line 82 through the bleed valve 84 at a slow flow rate to provide, for example, 1-2% of hydrogen gas, but not to exceed 4% of hydrogen gas, in the cathode side 14. As a result of the hydrogen-oxygen reaction in the cathode side 14, the voltage of the stack 12 decreases from zero to a negative voltage because the oxygen in the cathode side 14 is being depleted.

When the voltage of the cells in the stack 12 decreases to a predetermined range, such as −0.1V to −0.2 V, the pump 80 is slowed down to gradually decrease the stack voltage to a lower negative range, such as −0.2 to −0.4V. The re-circulation pump 80 is then stopped and the bleed valve 84 is closed. Further, the control valve 28 is opened to provide hydrogen gas from the source 24 to the anode side 16. At this time, there is almost no oxygen in the cathode side 14 because the oxygen is consumed by the hydrogen gas from the bleed valve 84. Further, the oxygen in the anode side 16 is also consumed by the hydrogen gas that propagates from the cathode side 14 through the membrane and the resistor 70 that dissipates electrons generated by the hydrogen electro-oxidation in the cathode side 14. Therefore, little to no carbon corrosion in the cathode side 14 will occur as a result of a voltage potential when the fresh hydrogen gas from the source 24 flows into the anode side 16.

After a few seconds, when the anode side 16 is filled with hydrogen gas, the switch 66 is closed to connect the auxiliary load 74 to the circuit 64, and the switch 68 is opened to disconnect the resistor 70 from the circuit 64. The output of the stack 12 is switched from the resistor 70 to the auxiliary load 74 during the start-up procedure to avoid burning out the resistor 70 when a large amount of current is generated. Further, switching from the auxiliary load 74 to the primary load 62 avoids an open circuit voltage condition that might damage the stack 12. The cathode side control valves 18 and 36 are then opened and the compressor 20 is turned on to deliver air to the cathode side 14. When the stack 12 is operating normally, the switch 66 is opened and the switch 60 is closed to connect the stack 12 to the primary load 62.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
a fuel cell stack including an anode side and a cathode side;
a compressor for providing an air flow to the cathode side of the fuel cell stack;
a hydrogen source for providing hydrogen gas to the anode side of the fuel cell stack;
a first switch for connecting power from the stack to a primary load;
a second switch for connecting power from the stack to an auxiliary load;
a third switch for connecting power from the stack to a shorting resistor that dissipates stack output power;
a cross-over valve for providing the air flow from the compressor to the anode side of the stack;
a re-circulation line for re-circulating cathode exhaust gas to the cathode side of the stack;
a bleed valve for selectively bleeding hydrogen gas into the re-circulating line; and
a controller programmed to control the system at start-up and shut-down, wherein the controller opens the first switch and closes the second switch to disconnect the first primary load and couple an output of the stack to the auxiliary load when the stack output voltage is reduced to a first predetermined range, re-circulates the cathode exhaust gas through the re-circulation line, bleeds a predetermined concentration of hydrogen gas into the re-circulation line, and uses the cross-over valve to purge the anode side of the stack with air at shut-down, and wherein the controller re-circulates the cathode exhaust gas through the re-circulation line, bleeds hydrogen gas into the re-circulation line until the stack voltage decreases to a second predetermined range and closes the third switch to short-circuit the stack at start-up.

2. The system according to claim 1 wherein the first predetermined range is 0.2-0.8 volts.

3. The system according to claim 1 wherein the predetermined concentration of hydrogen is less than four percent.

4. The system according to claim 1 wherein the controller further bleeds a small amount of hydrogen gas into the anode side at shut-down so that the pressure within the anode side is maintained slightly above ambient pressure.

5. The system according to claim 1 wherein the controller closes the second switch to connect the stack to the auxiliary load and then closes the third switch to connect the shorting resistor to the stack at shut-down.

6. The system according to claim 1 wherein the controller closes the second switch and opens the third switch before closing the first switch at system start-up to connect the auxiliary load to the stack before the primary load.

7. The system according to claim 1 wherein the second predetermined range is less than 0.2 volts.

8. The system according to claim 1 wherein the system is on a vehicle.

9. A fuel cell system comprising:
a fuel cell stack including an anode side and a cathode side;
a compressor for providing an air flow to the cathode side of the fuel cell stack;
a hydrogen source for providing hydrogen gas to the anode side of the fuel cell stack;
a first switch for connecting power from the stack to a primary load;
a second switch for connecting power from the stack to a shorting resistor that dissipates stack output power;
a third switch for connecting power from the stack to an auxiliary load to disconnect the primary load but avoid an open circuit voltage at shut-down and to disconnect the shorting resistor before connecting the primary load at start-up;
a re-circulation line for re-circulating cathode exhaust gas to the cathode side of the stack;
a bleed valve for bleeding hydrogen gas into the re-circulation line; and
a controller programmed to control the system at start-up and shut-down, wherein the controller selectively closes the second switch and selectively bleeds hydrogen gas through the bleed valve into the re-circulation line to combine both a stack shorting process and a cathode re-circulation process to minimize cathode corrosion.

10. The system according to claim 9 wherein the controller bleeds a small amount of hydrogen gas into the anode side at shut-down so that the pressure within the anode side is maintained slightly above ambient pressure.

* * * * *